(12) United States Patent
Dalland et al.

(10) Patent No.: US 10,090,799 B2
(45) Date of Patent: Oct. 2, 2018

(54) TENSIONED SHEET-METAL BASED SOLAR PANELS AND STRUCTURES FOR SUPPORTING THE SAME

(71) Applicant: Pvilion, Inc., New York, NY (US)

(72) Inventors: Todd Dalland, New York, NY (US); Robert Lerner, Port Washington, NY (US); Colin Touhey, Brooklyn, NY (US)

(73) Assignee: Pvilion, Inc., New York, NY (US)

( * ) Notice: Subject to any disclaimer, the term of this patent is extended or adjusted under 35 U.S.C. 154(b) by 822 days.

(21) Appl. No.: 13/738,700

(22) Filed: Jan. 10, 2013

(65) Prior Publication Data

US 2013/0174889 A1 Jul. 11, 2013

Related U.S. Application Data

(60) Provisional application No. 61/631,735, filed on Jan. 10, 2012.

(51) Int. Cl.
| | |
|---|---|
| *H02S 20/10* | (2014.01) |
| *F24J 2/52* | (2006.01) |
| *H02S 20/00* | (2014.01) |
| *F24S 25/00* | (2018.01) |
| *E04H 6/02* | (2006.01) |
| *H02S 30/10* | (2014.01) |
| *H02S 30/20* | (2014.01) |
| *H02S 20/22* | (2014.01) |

(Continued)

(52) U.S. Cl.
CPC .............. *H02S 20/10* (2014.12); *E04H 6/025* (2013.01); *F24J 2/52* (2013.01); *F24S 25/00* (2018.05); *F24S 25/10* (2018.05); *H02S 20/00* (2013.01); *H02S 20/22* (2014.12); *H02S 30/10* (2014.12); *H02S 30/20* (2014.12); *E04H 15/58* (2013.01); *F24S 2025/017* (2018.05); *Y02B 10/10* (2013.01); *Y02B 10/20* (2013.01); *Y02E 10/47* (2013.01)

(58) Field of Classification Search
CPC .......... F24J 2/00; F24J 2/38; F24J 2/52; F24J 2/523; H01L 31/048; H02S 20/00; H02S 20/10; H02S 30/10; H02S 20/22; H02S 30/20; E04H 6/025; F24S 25/00; F24S 25/10
See application file for complete search history.

(56) References Cited

U.S. PATENT DOCUMENTS

| | | | | |
|---|---|---|---|---|
| 4,713,492 A | * | 12/1987 | Hanak | H02S 30/20 126/624 |
| 4,835,918 A | * | 6/1989 | Dippel | E04B 7/14 126/698 |

(Continued)

*Primary Examiner* — Allison Bourke
(74) *Attorney, Agent, or Firm* — Kramer Levin Naftalis & Frankel LLP

(57) ABSTRACT

Tensioned sheet-metal based solar panels and structures for supporting the same are disclosed. The sheet metal based solar panels can include a flexible photovoltaic solar module laminated onto a thin, flexible metal sheet. Such solar panels can be mounted on and tensioned within a support frame that is twisted out of plane with respect to a reference planar datum surface. The resulting surface can be a hyperbolic paraboloid, which can be aesthetically pleasing while improving structural stability and maximizing angular exposure to the sun.

15 Claims, 8 Drawing Sheets

(51) Int. Cl.
*F24S 25/10* (2018.01)
*E04H 15/58* (2006.01)

(56) References Cited

U.S. PATENT DOCUMENTS

| | | | |
|---|---|---|---|
| 7,282,132 B2 * | 10/2007 | Iwata | C25D 9/04 |
| | | | 205/199 |
| 7,576,282 B2 * | 8/2009 | Heidenreich | E04F 10/06 |
| | | | 136/243 |
| 2006/0254118 A1 * | 11/2006 | Warecke | A01K 97/10 |
| | | | 43/21.2 |
| 2009/0314335 A1 * | 12/2009 | McClintock | F24J 2/5211 |
| | | | 136/251 |
| 2010/0000516 A1 * | 1/2010 | Conger | F24J 2/5241 |
| | | | 126/569 |
| 2010/0108113 A1 * | 5/2010 | Taggart | E04F 10/08 |
| | | | 135/96 |
| 2011/0277809 A1 * | 11/2011 | Dalland | H02S 20/10 |
| | | | 136/244 |

* cited by examiner

TENSIONED SHEET-METAL BASED SOLAR PANELS AND STRUCTURES FOR SUPPORTING THE SAME

CROSS-REFERENCE TO RELATED APPLICATIONS

This application claims the benefit of U.S. Provisional Patent Application No. 61/631,735, filed Jan. 10, 2012, which is incorporated herein by reference in its entirety.

FIELD OF THE INVENTION

This disclosure can relate to tensioned sheet metal based solar panels and structures for supporting the same.

BACKGROUND OF THE DISCLOSURE

Photovoltaic modules can convert solar energy into electricity through the photovoltaic effect, which is a process by which the energy contained in photons is converted into electrical current. Photovoltaic cells are typically formed of a semiconductor, such as silicon. The semiconductor lattice can absorb received photons, thereby releasing bound electrons and producing electric current. When silicon is used as a light absorbing material in a photovoltaic module, it can be in bulk, crystalline form or in a thin film of amorphous silicon. Additionally, other non-silicon based materials such as cadmium-indium-gallium-(di)selenide ("CIGS") and cadmium telluride ("CadTel"), for example, can be used to create the photovoltaic effect.

Photovoltaic cell modules have been mounted atop structures designed to shade parking areas while at the same time generating electricity. Generally, such structures are permanent installations constituting real property and form a single structure or building covering several parking spaces in a parking lot. Such structures are often arranged in rows parallel to and above rows of parking spaces. These structures may alternatively be deployed and utilized as electric vehicle recharging stations. The erection of such structures is a significant site construction project often requiring building permits.

Additionally, where steel framing is utilized, assembly and erection have been directed to permanent installation using primarily welded joints in the assembly of the frame. Where parking lots exhibit varying surface elevation or unusual or irregular plan layouts, additional expense is incurred in customizing and building out such structures over a row or group of parking spaces because either the structure itself must be conformed to the varying terrain level or unusual or irregular plan layout, or costly grading and earth moving may be required to accommodate horizontal foundations of the structure.

Flexible solar modules have been laminated onto roof surfaces, walls, and fabric structures. The photovoltaic cells typically contain amorphous silicon or other materials such as copper indium gallium selenide (CIGS), and the cells are deposited onto flexible substrates. Such flexible solar modules are typically laminated onto metal strips that have their edges folded up into standing seams for attachment to standing seam roofs.

SUMMARY OF THE DISCLOSURE

Tensioned sheet-metal based solar panels and structures for supporting the same are disclosed. Sheet-metal based solar panels can include a flexible photovoltaic module laminated onto a thin metal sheet. The thin metal sheet may be capable of being placed under tension, and warped or twisted while under tension, without adverse effect. The type of metal used may also be resistant to the effects of weather including, for example, wind and snow loads.

Structures for supporting such sheet metal based solar panels can utilize the flexibility of thin sheet to optimize exposure to solar radiation reception and to provide aesthetic visual appeal. Additionally, the support system disclosed herein can provide sufficient strength and appropriate configuration to be able to place the sheet-metal based photovoltaic panel under tension. Tensioning the panels may enable the panels to bear increased wind loads and assume configurations that can enhance the amount of solar radiation received and converted into electric current. Warping or twisting the tensioned panels can still further enhance these effects.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Mounting flexible photovoltaic modules on metal sheeting that is also flexible offers numerous advantages. For example, a flexible sheet metal solar panel can be formed into a roll (e.g., for storage or shipping) or manipulated into configuration that, as installed, can be other than flat. A sheet-metal based solar panel can generally be of varying rectangular or trapezoidal dimensions. However, one skilled in the art will appreciate that sheet-metal based solar panels may be formed into any suitable shape depending upon factors such as the application, space constraints, and aesthetic considerations, for example. These panels may be mounted on the support systems described herein or, alternatively, they may be mounted on large span steel hyperbolic parabolic cable net structures capable of supplying tension to the panels. Still further, they may be tensioned as flat strips within a planar frame or other support systems.

Sheet-metal based solar panels may be installed on a modular support system that may include support columns, which may be formed from any suitable material including steel, for example. Such systems may be appropriate for use as a carport that can provide generated power to the power grid and/or recharge electric vehicles. Additionally, the tensioned sheet-metal based solar panels, whether twisted or flat, may be used in a broad spectrum of applications such as, for example, horizontally or vertically oriented surfaces on building façades to achieve building integrated photovoltaic energy harvesting, free standing shade structures, entrance canopies, awnings, or other structural applications.

Additionally, twisting the support frame members out of plane with the ground provides a slanted position of the perimeter members with respect to the ground plane. This angular position enables the support frame members to serve as suspension points for banner advertising strips or panels which can also be out of plane with respect to the ground. Such positioning may be more attention provoking to passersby than presentations that are parallel to the ground plane.

Figure 1:
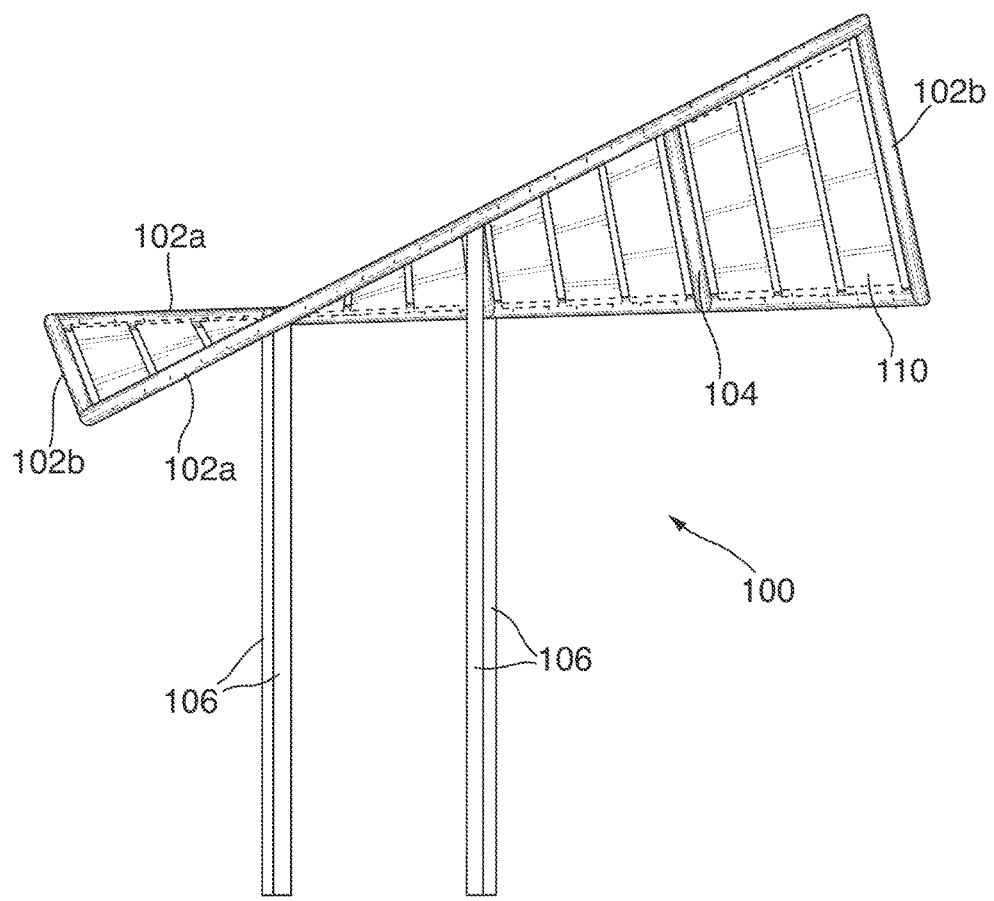
FIG. 1 depicts an illustrative tensioned sheet-metal based solar panel system, in accordance with various embodiments.

FIG. 1 depicts an illustrative tensioned sheet-metal based solar panel system 100, in accordance with various embodiments. System 100 can include perimeter support members 102a and perimeter cross members 102b (referred to together as perimeter members 102), cross members 104, support columns 106, and flexible solar panels 110. As used herein, the term "flexible solar panels" can refer to flexible photovoltaic modules laminated, or otherwise coupled, to a sheet metal substrate. Further, flexible solar panels may also refer to embodiments in which individual flexible solar cells that are not part of a larger module are coupled to a sheet metal surface. Perimeter members 102 and cross members 104, when coupled together, may be referred to herein as a "support frame."

Perimeter members 102 can form the perimeter of a support frame for supporting flexible solar panels 110. Perimeter members 102 may be tubes formed from a material suitable for supporting flexible solar panels 110 under tension and withstanding harsh environmental conditions including, for example, strong winds, rain, and snow (e.g., steel, stainless steel, or aluminum). The support frame can be designed with diagonally opposite corners being raised and lowered relative to one another and with reference to a planar datum surface (e.g., the plane of the ground). Accordingly, the support frame can be twisted out of plane with the datum surface, creating a hyperbolic parabolic surface implied within the frame. As described below with respect to FIG. 4, the support frame may be twisted out of plane either symmetrically or asymmetrically, depending on the application.

The hyperbolic parabolic surface implied within the frame can provide the template for tensioning, warping, and/or twisting flexible solar panels 110 into a final desired configuration. Hyperbolic paraboloids are saddle shaped, doubly-curved surfaces that may be defined by the following equation:

$$\frac{z}{c} = \frac{x^2}{a^2} + \frac{y^2}{b^2} \quad (1)$$

The final desired configuration of flexible solar panels 110 may be designed to maximize the potential to bear increased wind and snow loads and/or enhance the amount of solar radiation received by the panels.

Cross members 104 can span the distance between two opposing perimeter support members 102a for the purpose of reinforcing the support frame. Cross members 104 may be coupled to perimeter support members 102a using any suitable fasteners or combinations of fasteners (e.g., bolts). According to some embodiments, cross members 104 may be tubes that are similar or identical to perimeter cross members 102b.

The support frame can be mounted on support columns 106 to elevate flexible solar panels 110 above the ground. First ends of support columns 106 can be bolt mounted to a concrete foundation, which may permit the entire system to be easily dismounted from the foundation. Second ends of support columns 106 may be coupled to perimeter members 102 to support the support frame. Support columns 106 may be coupled to perimeter members 102 with any suitable fasteners or combination of fasteners (e.g., bolts). As depicted in FIG. 1, the support frame can be mounted on a total of four support columns 106 with two support columns 106 coupled to each of two perimeter support members 102a on opposing sides of the support frame. According to some embodiments, support columns 106 can be coupled to perimeter support members 102a at the points where cross members 104 are coupled to perimeter support members 102a.

Because the support frame may be twisted out of plane, support members 106 can be of varying lengths. For example, support members 106 closer to a more highly elevated corner of the support frame may be longer than support members 106 closer to a less elevated corner. As one skilled in the art will appreciate, however, if the installation surface is not flat, support members 106 can be formed with appropriate lengths such that the support frame is properly oriented with respect to the planar datum surface (i.e., if the support frame was not twisted, it would lie in a plane parallel to the planar datum surface).

Each flexible solar panel 110 can include a flexible photovoltaic module laminated, or otherwise securely affixed (e.g., with an adhesive) onto a thin metal sheet. Coupling of the flexible photovoltaic module to the thin metal sheet may be conducted in a clean environment to ensure high-quality adhesion, which can help extend the life of flexible solar panel 110 even with after the panel is tensioned, twisted, and/or warped. The flexible photovoltaic module may be, for example, any commercially available flexible photovoltaic module that is capable of generating electricity via the photovoltaic effect.

The thin metal sheet can be formed from any suitable material capable of supporting a flexible photovoltaic module while under tension and withstanding harsh environmental conditions such as strong winds, rain, and snow, for example. The thin metal sheet may also be capable of being subjected to twisting and/or warping without suffering adverse structural effects. Accordingly, the thin metal sheet can be formed from a metal such as steel, stainless steel, or aluminum, for example.

As disclosed above, the support frame formed from perimeter members 102 and cross members 104 may be twisted out of plane with respect to a planar datum surface so as to create an implied a hyperbolic parabolic surface within the frame. Flexible solar modules 110 formed into strips may be tensioned between opposite sides of the support frame, collectively forming a surface that is of varying plane as mandated by the shape of the frame.

As described above, flexible photovoltaic modules may be mounted on the tensioned sheet metal strips to form flexible solar panels 110 in order to collect solar energy. Accordingly, system 100 can include a solar radiation collecting hyperbolic parabolic surface that presents photovoltaic modules facing the sun in varying geometries, which can augment or otherwise optimize power generated. Furthermore, the tensioning of flexible solar modules 110 can render the surface both non-dynamic and non-fluttering under wind loads. As such, tensioned flexible solar modules 110 may be considered a primary structural member of system 100 rather than a surface application or treatment. Thus, the hyperbolic parabolic surface may offer aesthetic value in terms of architectural design as well as utility in maximizing angular exposure to the sun and improving structural performance of flexible solar panels 110.

According to some embodiments, flexible solar panels 110 may have excellent thickness-surface area aspect ratios compared to typical solar modules. For example, flexible solar panels 110 can be approximately 1/16" (0.16 cm) thick for lengths and widths of 20' (6.1 m) or 40' (12.2 m) or more.

Figure 2:
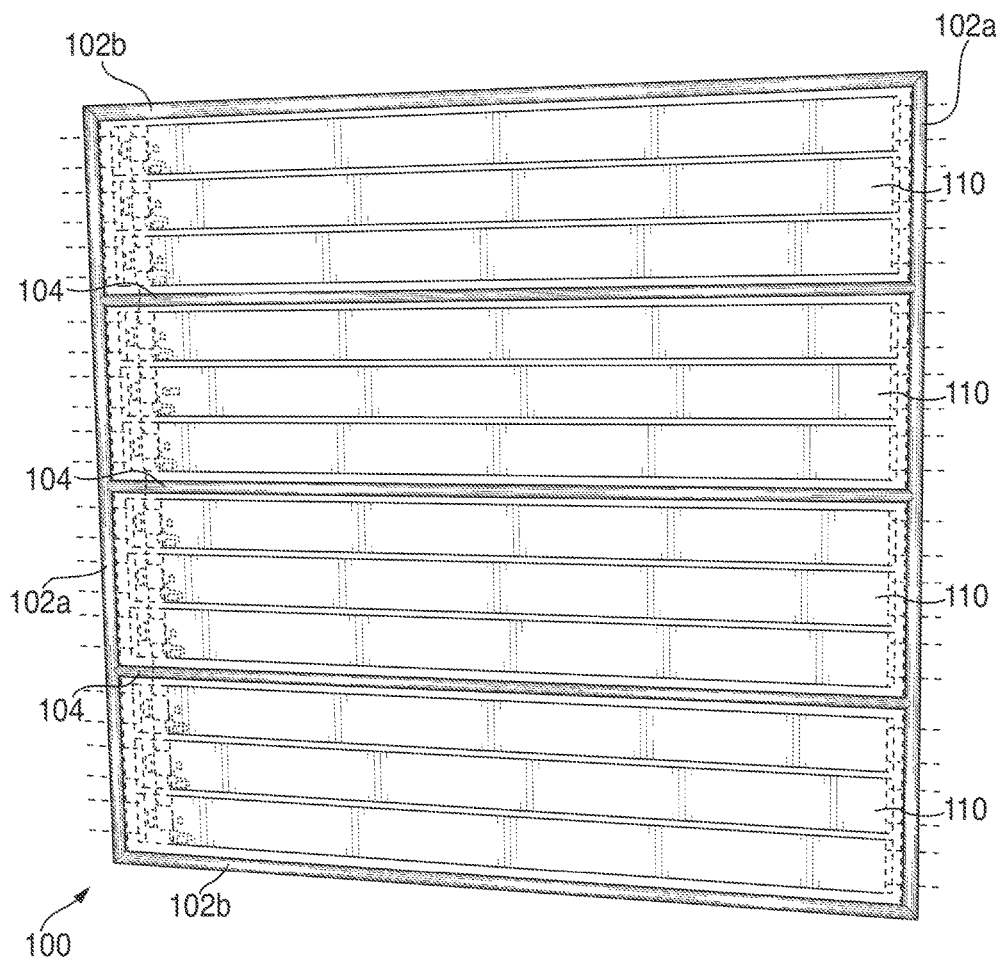
FIG. 2 depicts a top plan view of the tensioned sheet-metal based solar panel system of FIG. 1, in accordance with various embodiments.

FIG. 2 depicts a top plan view of tensioned sheet-metal based solar panel system 100 of FIG. 1, in accordance with various embodiments. As shown in FIG. 2, the support frame, including perimeter members 102 and cross members 104 can form an apparent square or rectangular shape in plan view. Thus, adjacent perimeter members 102 can form apparent 90° angles when viewed in plan. Similarly, cross members 104 can form apparent 90° degree angles with the two opposing perimeter support members 102a, to which they are coupled.

In one specific embodiment, the outer dimensions of the support frame are 20' by 20' (6.1 m×6.1 m). Three cross members 104 of 20' (6.1 m), equally spaced, cross from one perimeter support member 102a to an opposing perimeter support member 102a. Thus, the support frame can include five approximately 20' (6.1 m) long members in one direction (i.e., two perimeter cross members 102b and three cross members 104) and two approximately 20' (6.1 m) perimeter members at an apparent 90 degree angle from the other five members when viewed in plan. A number of support columns (e.g., the four support columns 106 of FIG. 1, which are not visible in FIG. 2) can support the support frame. In some embodiments, the support columns can average 12' (3.66 m) in height, varying in height depending on the degree to which the perimeter member to which they are attached may be out of plane with the ground.

Figure 3:
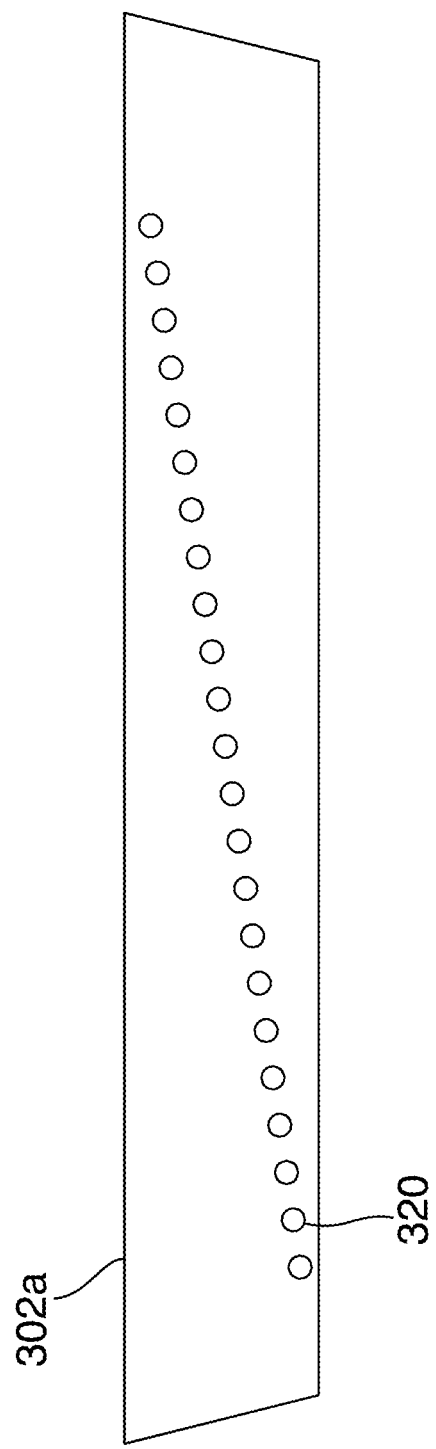
FIG. 3 depicts an illustrative schematic view of a perimeter member including helical holes, in accordance with some embodiments.

FIG. 3 depicts an illustrative schematic view of a perimeter support member 302a including helical holes 320, in accordance with some embodiments. Perimeter support member 302a can correspond to one of perimeter support members 102a of FIG. 1, for example. In order to attach flexible solar panels (e.g., flexible solar panels 110 of FIG. 1) to the perimeter members of a support frame, and to accommodate the gradient variability to which each of the flexible solar panels may be exposed, holes following a helical curve can be formed in perimeter support member 302a. Fasteners can be passed through helical holes 320 for coupling one or more flexible solar panels to the support members. According to some embodiments, the fasteners can include tension rods passed through helical holes 320, as disclosed in more detail below with respect to FIG. 4.

Helical holes 320 can be formed using any suitable process (e.g., drilling, machining, stamping, or molding), and each hole may extend fully through perimeter support member 302a. In one exemplary process, perimeter support member 302a can be periodically turned through a predetermined angle while helical holes 320 are formed. The predetermined angle may be chosen based on the amount of skew desired in the final hyperbolic parabolic surface implied within the support frame that can be partially formed using perimeter support member 302a.

For symmetric instantiations of a tensioned sheet-metal based flexible solar panel system (e.g., system 100 of FIG. 1), perimeter support member 302a can be rotated through a fixed angle in increments proportional to the position of each hole along the length of perimeter support member 302a. That is, helical holes 320 can lie on a cylindrical helical curve (i.e., its tangent makes a constant angle with a fixed line in space). Symmetric systems can be symmetrically twisted out of plane with reference to a planar datum surface such that diagonally opposite corners may be raised and lowered equally relative to one another and with reference to a planar datum surface. In general, a symmetrical arrangement may maximize exposure to solar radiation in equatorial or tropical regions.

Alternatively, for asymmetric instantiations of a tensioned sheet-metal based flexible solar panel system, perimeter support member 302a can be rotated through a predetermined angle in variable increments along the length of perimeter support member 302a. That is, for asymmetric systems, helical holes 320 can lie on a circular helical curve (i.e., one with a constant radius), although the pitch may vary along the length of perimeter support member 302a. Asymmetric systems can be asymmetrically twisted out of plane with reference to a planar datum surface such that diagonally opposite corners may be raised and lowered unequally relative to one another and with reference to a planar datum surface. In general, asymmetric instantiations may result in greater exposure to solar radiation in non-equatorial or temperate regions (i.e., generally from the southerly direction in the northern hemisphere) while maintaining the aesthetic appeal of the visual wave effect created by the hyperbolic parabolic surface of the frame.

According to some embodiments, flexible solar panels can be attached to perimeter frame members on opposite sides of the support frame using adjustable tension rod connectors. Because of variations in ambient temperature, adjustments may be required in tension levels for the flexible solar panels in order to maintain structural integrity, resistance to wind loads, and aesthetic fidelity. Additionally, the flexible solar panels may stretch due to being under long term tension, therefore requiring periodic adjustment. Although tension rods can provide the above-disclosed benefits, one skilled in the art will appreciate that flexible solar panels can be coupled to the perimeter members of the support frame using any suitable combination of fasteners and/or adhesives.

Figure 4:
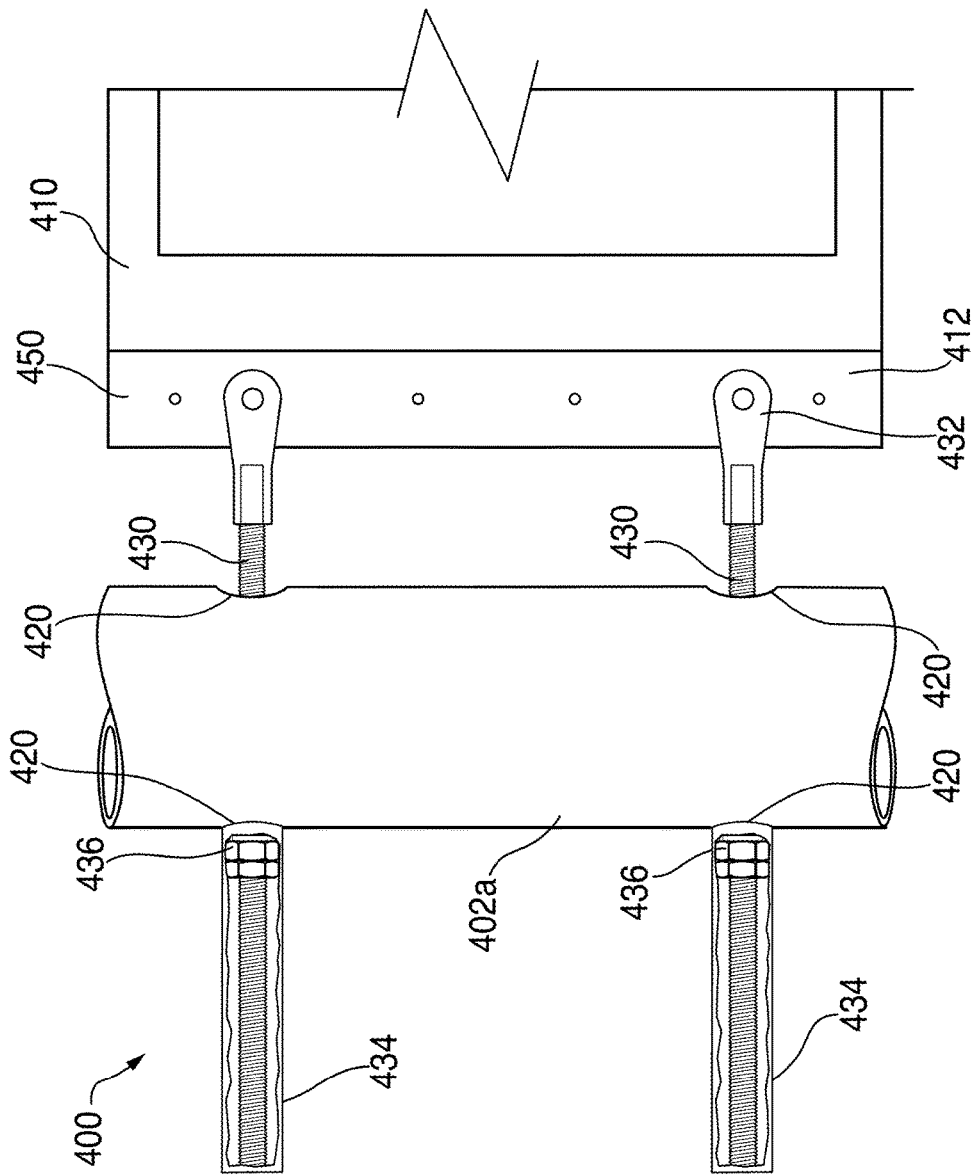
FIG. 4 depicts an illustrative top plan view of a tensioned sheet-metal based flexible solar panel system, in accordance with some embodiments.

FIG. 4 depicts an illustrative top plan view of a tensioned sheet-metal based flexible solar panel system 400, which may include flexible solar panel 410 coupled to a perimeter support member 402a using tension rods 430, in accordance with some embodiments. Tension rods 430 can be passed through helical holes 420 formed in perimeter support member 402a to couple flexible solar panel 410 to perimeter member 402. In addition, fasteners 432 can couple first ends of tension rods 430 to flexible solar panel 410, and sleeves 434 can be threadably coupled to second ends of tension rods 430 extending away from perimeter support member 402a and flexible solar panel 410.

According to some embodiments, fasteners 432 can be fork-end fasteners. A first end of a fork-end fastener 432 can be threadably engaged, or otherwise securely coupled, to the first end of a tension rod 430. A second end of fork-end fastener can be securely coupled to flexible solar panel 410 using a suitable fastener such as, for example, a rivet, a bolt, or a screw. In some embodiments, flexible solar panel 410 can include coupling regions that are not covered by flexible photovoltaic modules, and the fasteners 432 can be coupled to flexible solar panel 410 in the coupling regions, exclusively. Furthermore, the coupling regions may be reinforced with any suitably flexible reinforcing material to provide additional strength to flexible solar panel 410.

In some embodiments, the reinforcing material can be an end clamp such as end clamp 450, for example. End clamp 450 may be formed from any suitable material such as anodized aluminum, for example. End clamp 450 can be coupled to an end of flexible solar panel 410 adjacent to perimeter support member 402a using fasteners (e.g., bolts or screws) passed through end clamp 450 and flexible solar panel 410. Flexible solar panel 410 can include bolt holes 412 for receiving these fasteners.

Sleeves 434 can be threadably coupled to second ends of tension rods 430 that extend away from both perimeter support member 402a and flexible solar panel 410. Sleeves 434 can be used to adjust the tension of tension rods 430 by rotating sleeves 434 against the surface of perimeter support member 402a. Accordingly, an outer diameter of sleeves 434 may be larger than the helical holes formed in perimeter support member 402a. Alternatively or additionally, washers may be interposed between sleeves 434 and perimeter support member 402a to prevent sleeves 434 from slipping into helical holes 420 and to protect the surface of perimeter support member 402a. In some embodiments, the outer surface of sleeves 434 may be specially shaped (e.g., rectangularly shaped) to allow for easy adjustment of tension in tension rods 430. Tension rods 430 and sleeves 434 can be formed from any suitable material such as stainless steel, for example. Alternatively or additionally, nuts 436 can be threadably coupled to tension rods 430 for the purpose of adjusting the tension on flexible solar panel 410.

Figure 5:
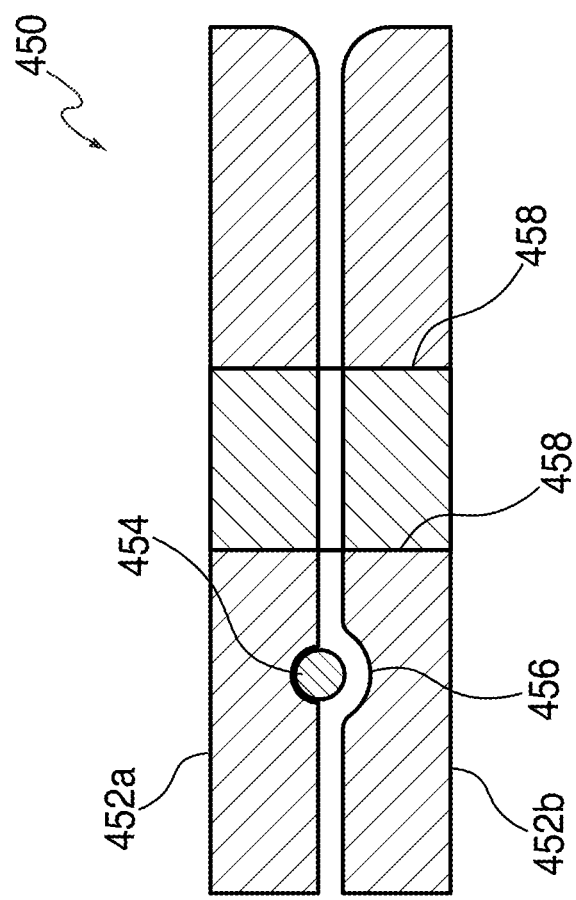
FIG. 5 depicts an illustrative cross-sectional view of the end clamp of FIG. 4, in accordance with some embodiments.

FIG. 5 depicts an illustrative cross-sectional view of end clamp 450 of FIG. 4, in accordance with some embodiments. As seen in cross section, end clamp 450 may house a rod 454 running perpendicular to the longitudinal dimension of flexible solar panel (e.g., flexible solar panel 410 of FIG. 1) and transversing the panel such that rod 454 follows a channel depression 456 in the clamp and in the flexible solar panel. The purpose of this rod and channel configuration is to fix the position of the flexible solar panel within the clamp and to resist any metal fatigue around or near the bolt holes (e.g., bolt holes 412) and fasteners 458 which otherwise pass through the flexible solar panel and fasten to the same.

According to some embodiments, the tensioned sheet-metal based solar panel systems disclosed herein can additionally include a continuous or periodic "U" cross section shaped edge clamp, which may run along either side longitudinal edge of each flexible solar panel. Such edge clamps may prevent or resist separation of the flexible photovoltaic module from the thin sheet-metal substrate, which together can form a flexible solar panel. A "U" shaped channel formed between adjacent flexible solar panels may additionally serve as a gutter or cable raceway for running and protecting electrical cables coupled to flexible solar panels.

Figure 6:
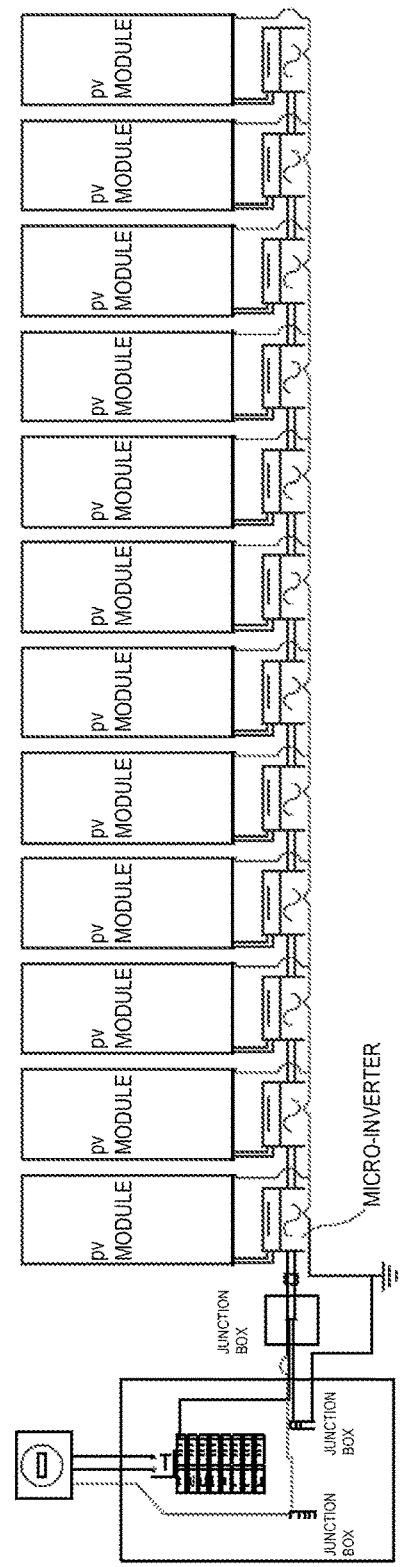
FIG. 6 depicts a schematic circuit diagram for a photovoltaic panel array, in accordance with some embodiments.

FIG. 6 depicts a schematic view of a circuit diagram 600 for a photovoltaic panel array 610, in accordance with some embodiments. Array 610 may correspond to a group of flexible solar panels contained within a single tensioned sheet-metal based solar panel system (e.g., flexible solar panels 110 of system 100 FIG. 1, for example).

As disclosed above, the individual flexible solar panels of array 610 may take on a hyperbolic parabolic shape within a support frame of the system.

Accordingly, the geometry of each flexible solar panel may vary from the geometry of every other flexible solar panel in array 610 and, therefore, each flexible solar panel may receive varying amounts of solar radiation as the sun moves across the sky. While a particular hyperbolic parabolic shape may optimize solar collection efficiency for array 610 as a whole, the current produced by each individual flexible solar panel may vary. As a result, using a series wired configuration for the flexible solar panels in array 610 can result in lowering overall power output.

Accordingly, an independent micro-inverter can be provided for each of the flexible solar panels in array 610 for converting the current of each module from DC to AC. The use of a micro inverter for each flexible solar panel in array 610, rather than a single inverter for array 610, can maximize the performance and efficiency of system 600.

Figure 7:
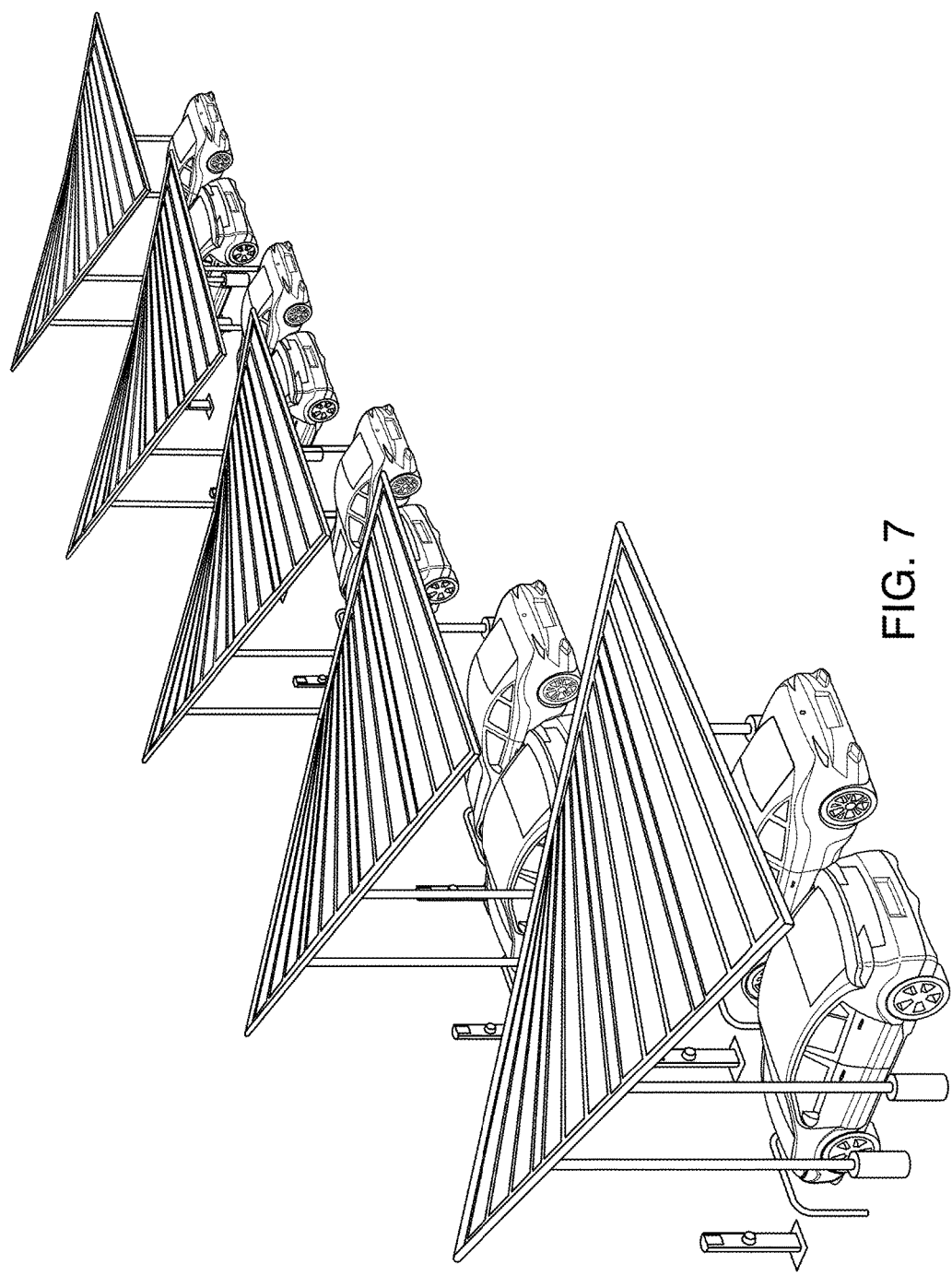
FIG. 7 depicts an illustrative installation including several tensioned sheet-metal based solar panel systems, in accordance with some embodiments.

FIG. 7 depicts an illustrative installation 700 including several tensioned sheet-metal based solar panel systems 701, in accordance with some embodiments. In particular, each system 701 can include a column mounted modular steel frame structure 708 that can support a tensioned sheet-metal based photovoltaic module array 710 designed to produce electricity, which may be sold into the power grid and/or provide a recharging service for electric vehicles. Each system 701 of installation 700 may also serve as a shade providing device for one or more automobile(s) parked beneath a corresponding array 710. Systems 701 according to such embodiments may be either symmetrical or asymmetrical systems. Systems 701 of installation 700 may be physically separated from each other and/or otherwise arranged so as to avoid self-shading.

Figure 8:
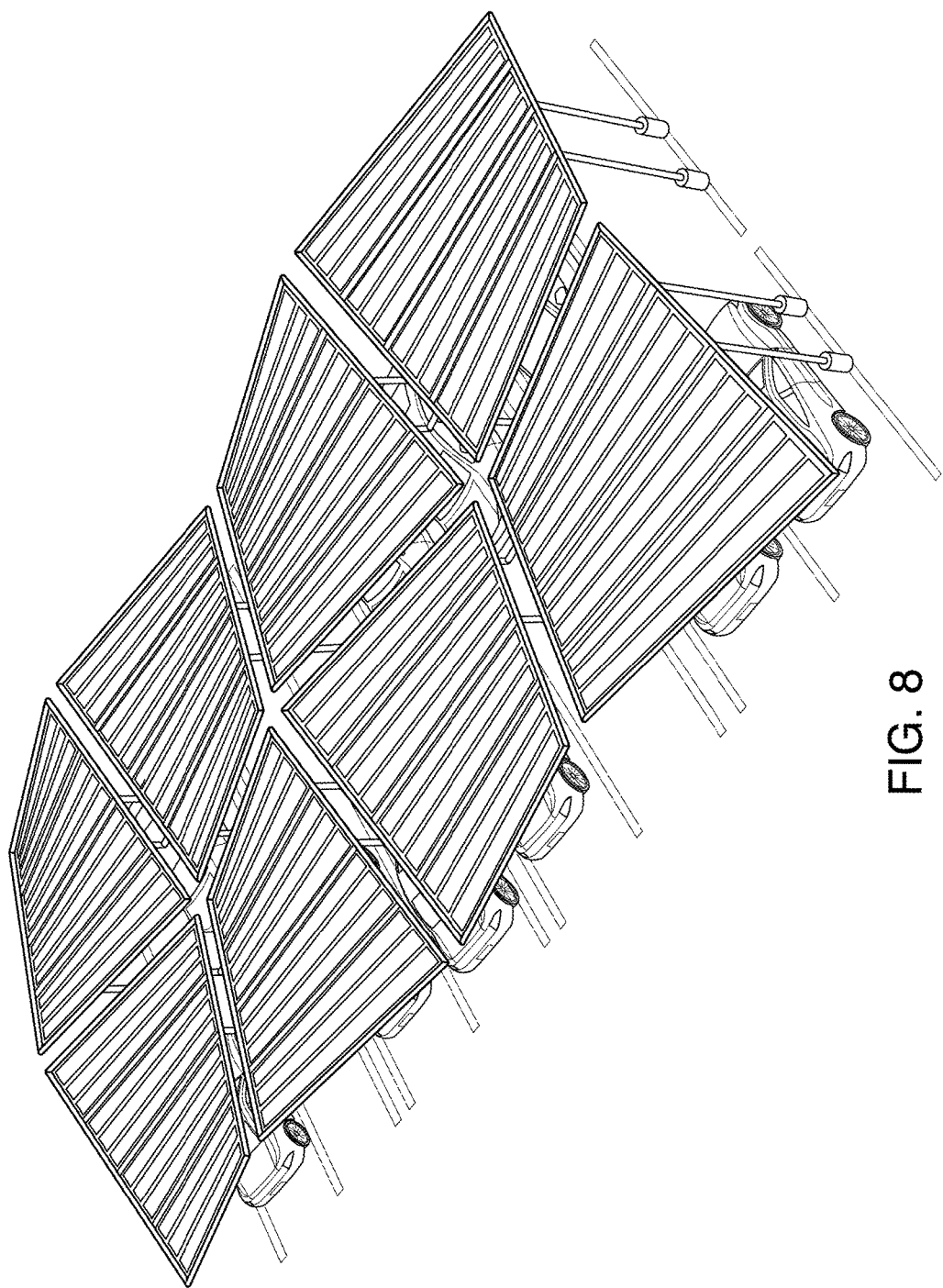
FIG. 8 depicts another illustrative installation including several tensioned sheet-metal based solar panel systems, in accordance with some embodiments.

FIG. 8 depicts an illustrative installation 800 including several tensioned sheet-metal based solar panel systems 801, in accordance with some embodiments. In particular, installation 800 can include a number of individual systems 801 arranged adjacent to one another along the edges of their respective support frames. Although symmetrical or asymmetrical systems may be incorporated into installation 800, a symmetrical configuration may enable installation to avoid self-shading.

While there have been described tensioned sheet-metal based solar panels and structures for supporting the same, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A system comprising:
   a support frame comprising:
      two perimeter support members, each comprising a plurality of holes formed in a helical curve pattern extending along a longitudinal length of a respective perimeter support member;
      two perimeter cross members, each perimeter cross member comprising a first end and a second end, wherein the first ends are coupled to opposite ends of a first perimeter support member and the second ends are coupled to opposite ends of a second perimeter support member to form four non coplanar corners; and at least one flexible solar panel coupled to a subset of the plurality of holes of the two perimeter support members with fasteners, wherein the fasteners are configured to provide tension to the flexible solar panel.

2. The system of claim 1, wherein the fasteners comprise tension rods.

3. The system of claim 2, wherein fork-end fasteners securely couple the tension rods to the at least one flexible solar panels, wherein first ends of the fork-end fasteners are securely coupled to the tensions rods, and wherein second ends of the fork-end fasteners are securely coupled to the at least one flexible solar panel.

4. The system of claim 1, wherein the at least one flexible solar panel forms a hyperbolic parabolic surface within the support frame.

5. The system of claim 1, further comprising at least one interior cross member coupled at its ends to the two perimeter support members along the helical curve pattern.

6. The system of claim 1, wherein each of the at least one flexible solar panel comprises:
a flexible sheet-metal substrate; and
at least one flexible photovoltaic module coupled to the flexible sheet-metal substrate.

7. The system of claim 6, wherein the flexible solar panel is configured to structurally withstand at least one of tensioning, twisting, and warping.

8. The flexible solar panel of claim 6, wherein the flexible sheet-metal substrate comprises stainless steel.

9. The flexible solar panel of claim 1, the flexible photovoltaic module comprising a plurality of photovoltaic cells.

10. The flexible solar panel of claim 9, wherein the plurality of photovoltaic cells comprises amorphous silicon photovoltaic cells.

11. The flexible solar panel of claim 6, wherein the flexible photovoltaic module is laminated to the flexible sheet-metal substrate.

12. The flexible solar panel of claim 6, wherein the flexible photovoltaic module is coupled to the flexible sheet-metal substrate with an adhesive.

13. The system of claim 1, wherein the helical curve pattern is a cylindrical helical curve with constant pitch.

14. The system of claim 1, wherein the perimeter cross members and the perimeter support members are tubular components.

15. The flexible solar panel of claim 1, further comprising a micro inverter electrically coupled to the plurality of photovoltaic cells configured to convert direct current (DC) to alternating current (AC).

* * * * *